United States Patent [19]

Lerner

[11] 4,132,232
[45] Jan. 2, 1979

[54] INTEGRALLY MOLDED PACIFIER FOR INFANTS

[75] Inventor: Robert Lerner, East Hills, N.Y.

[73] Assignee: Formulette Co., Inc., Long Island City, N.Y.

[21] Appl. No.: 802,589

[22] Filed: Jun. 1, 1977

[51] Int. Cl.² ............................................. A61J 17/00
[52] U.S. Cl. .................................................... 128/360
[58] Field of Search .......................... 128/252, 359, 360

[56] References Cited

U.S. PATENT DOCUMENTS

| 635,226 | 10/1899 | Borcher | 128/360 |
| 1,826,943 | 10/1931 | Maker | 128/359 |

FOREIGN PATENT DOCUMENTS

| 170612 | 7/1934 | Switzerland | 128/360 |
| 16809 of | 1901 | United Kingdom | 128/360 |
| 112200 | 1/1918 | United Kingdom | 128/360 |

Primary Examiner—Dalton L. Truluck

[57] ABSTRACT

An integrally molded pacifier for infants includes a generally planar guard member in the form of a disc and a hollow nipple which extends axially therefrom. The nipple includes a stem portion open at one end and terminating in a closed end remote from one face of the guard member. The wall of the stem of the nipple is provided with at least one aperture between its closed end and the guard.

7 Claims, 5 Drawing Figures

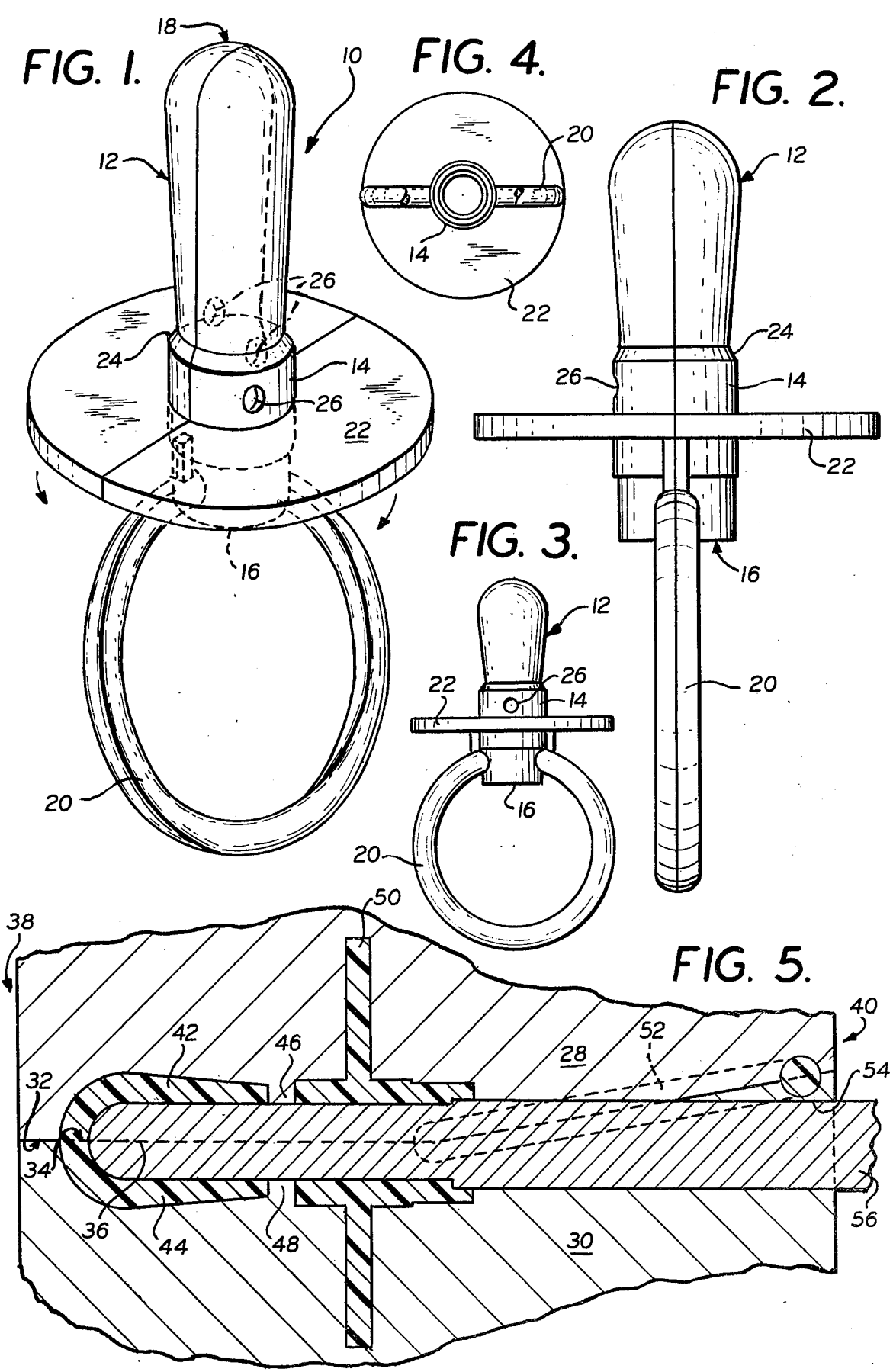

INTEGRALLY MOLDED PACIFIER FOR INFANTS

BACKGROUND OF THE INVENTION

The present invention relates to pacifiers for infants and more particularly to a pacifier of which all of the component parts are formed integrally by molding.

Pacifiers for infants have, of course, been known for many years heretofore. However, the pacifiers which have been available to date have been found to be hazardous in use. Studies have shown, for example, that infants, on occasion, swallow the pacifier and sometimes die from asphixiation. The provision of a transversely extending guard member ameliorates this condition to some extent; however, cases are of record in which the pacifier guard or shield has become lodged in the throat of the infant and could not be removed prior to the infant's asphixiation.

It has been proposed by the Consumer Product Safety Commission, in a change to 16 CFR 1500 and 1511, Published in Federal Register, Vol. 41, No. 204, Oct. 20, 1976, to provide apertures in the guard of the pacifier such that even in those situations where the guard member becomes lodged in the mouth or throat of the infant a passage for air will be provided to avoid asphixiation. However, although apparently satisfactorily in theory, it is contemplated that such a proposed safeguard may not produce the desired results in practice. Thus, one characteristic of infants is the relatively large amount of salivation which they produce when sucking a nipple and it would be expected that such salivation would interfere with or totally prevent the passage of air through such apertures. Further, the mouth of an infant is small so that should the nipple and guard be ingested the guard would fold over, and the aperture would become blocked. Additionally, the location of the apertures in the transversely extending guard member poses a problem in the fabrication of the pacifier.

It will, therefore, be appreciated that although the hazardous nature of pacifiers has already been recognized there has yet to be advanced a satisfactory solution to the problem.

SUMMARY OF THE INVENTION

It is one object of this invention to provide a pacifier for infants which exhibits in use enhanced safety characteristics.

It is another object of the invention to provide a pacifier for infants which can be fabricated easily and at relatively low cost.

It is still another object of this invention to provide a pacifier for infants which, even though ingested by the infant, will maintain a clear air passage preventing asphixiation.

It is a further object of this invention to provide a process for the fabrication of a pacifier for infants.

Other objects and advantages of the invention will become readily apparent to persons skilled in the art from the following description of the invention.

SUMMARY OF THE INVENTION

According to the present invention, a pacifier for infants is provided which comprises a hollow nipple, open at one end and closed at its other end, a guard member secured about the perimeter of the nipple adjacent its open end and extending in plane transverse to the axis of said nipple, said nipple having at least one aperture formed in the wall thereof between said guard member and the closed end thereof.

Preferably, the wall of the nipple is formed with an enlarged thickness forming a base adjacent its open end to which the guard member is secured, and in which the apertures are formed. The base portion provides increased stability against bending, folding or collapsing, thereby insuring the maintenance of the apertures in open condition. It is also desirable to provide a handle such as an enlarged loop. This can be easily attached to the base portion on the side thereof away from the closed end of the nipple.

BRIEF DESCRIPTION OF THE DRAWINGS

In order that the invention may be more fully comprehended, it will now be described, by way of example, with reference to the accompanying drawing, in which:

FIG. 1 is a perspective view of a pacifier for infants embodying the features of the invention;

FIG. 2 is a side elevational view of the pacifier as shown in FIG. 1;

FIG. 3 is a front view of the pacifier shown in FIG. 1;

FIG. 4 is a bottom plan view of the pacifier shown in FIG. 1; and

FIG. 5 is a fragmentary view, in cross-section, taken along a vertical plane through a mold uniquely adapted to produce the pacifier of the invention.

DETAILED DESCRIPTION OF THE INVENTION

Referring to the drawings, there is shown a pacifier for infants identified generally by reference numeral 10. The pacifier is fabricated in an integral form from one of the conventional resinous materials commonly employed in the production of such articles and may include both thermosetting and thermoplastic materials.

The pacifier, as may thus be seen from FIG. 1, includes an axially extending nipple 12 of a shape to be easily sucked on by an infant which is hollow and provided with a thickened wall at one end forming a base portion 14. The base portion 14 is open at its outer end 16 while the nipple itself terminates in a closed end 18, adapted to be inserted in the mouth.

A handle 20 is integral with the base of the nipple and, as shown in FIG. 1, is desirably in the form of an enlarged ring which extends generally axially of the pacifier. Integral with the base portion of the nipple and extending transversely therefrom is a guard or shield member 22. Such guard member is preferably in the form of an annular disc as depicted in FIG. 1, integral about the perimeter of the nipple, or base portion thereof, adjacent the open end. The base portion 14 preferably extends outwardly away from the guard member 22 a distance almost equal to the radial extent of the guard member.

The base portion 14, as is the remainder of the nipple, is hollow and thereby affords a passageway for air commencing at the outer extremity of the base beyond the region at which the guard member projects therefrom. The advantage of such a construction will become clear from the ensuing description. The base portion of the nipple is provided with a region of increased wall thickness at least on the axial side of the guard member from which the stem 16 extends. The base portion desirably terminates in an annular shoulder 24, which shoulder is preferably chamfered as shown in FIG. 1.

At least one aperture or through hole 26 is provided in the wall of the nipple between the guard and the closed end of the nipple. Preferably, a pair of apertures diametrically opposed to each other in the base portion 14 is preferred, although such apertures may be formed at the chamfered shoulder of the base 14 of the nipple, as indicated in the dotted lines. It will, of course, be appreciated that the number of apertures and their precise location may be varied, although it is to be preferred that they lie close to guard member rather than the closed end of the nipple. Further, although radially extending apertures are shown and preferred, they may extend at an angle to the axis of the nipple.

The provision of the apertures in the nipple at the mouth side of the guard member serves to insure that even if the infant positions its mouth over the outer peripheral edge of the guard member so as to partially swallow the pacifier the integrity of the air passage from the open end of the base is maintained. This is so since, if swallowed, the guard member will be flexed, as indicated by the arrows, away from the apertures 26, and over the protruding outer end of the base 14. Consequently, the air passage from the open end throug the apertures will be preserved and will minimize, if not completely eliminate, the possibility of asphixiation.

The pacifier of the invention may be fabricated by a casting or molding procedure such as injection molding or transfer molding. A presently preferred process and mold construction will be described with reference to FIG. 5 of the drawing; however, it will be understood that persons skilled in the art will recognize that modifications in such preferred process and mold construction can be made within the scope of the invention.

In FIG. 5, there is shown a portion of each of the sections of a two-section mold, such mold sections 28, 30 are constructed in the usual manner of a high melting point metal or alloy and, although not shown, the customary reservoir for the molding resin cooling means for the mold, when such is necessary, and injection plungers or the like are provided for the introduction of the molding material into the mold cavities.

It will be observed from FIG. 5 that the sections of the mold are given complementary mating faces 32, 34 which together define a parting line 36 for the mold. Such faces for the mold sections are seen as extending in a longitudinally straight line from one end 38 of the mold to an intermediate location and thence in angularly inclined disposition to the other end 40 of the mold.

Axially extending cavities 42, 44 are formed in the respective mold sections and are disposed symmetrically about the parting line so as to extend for a substantial extent throughout the longitudinally straight portion of each mold section. Such axial cavities turn inwardly towards the respective mating faces of the mold sections so as to be alignable when the mold sections are brought into abutting relation for the molding step. The axially extending cavities are interrupted by transverse projections 46, 48 of the mold, each of which is coextensive with the depth of the cavity. Such projections are provided in order to form apertures 26 in the nipple.

A transversely extending mold cavity, communicating with the axially extending cavity in the mold section described heretofore is provided in each mold section and is identified by reference numeral 50. Such transverse cavities are designed for molding of the guard member 22 of the pacifier.

Each of the mold sections is further provided with an axially extending cavity 52 extending along the angularly inclined mating face. One end of such cavity is in open communication with the corresponding one of cavities 42, 44 and is arcuately disposed within the mold section, as will be readily understood by persons versed in the art, in order to form a handle in the form of a ring as shown in FIGS. 1 and 3 of the drawings. The other end of each cavity 52 extends within the mold section so as to be brought into alignment with the corresponding end of the cavity in the mating mold section when the mold sections are brought into abutting engagement for molding.

The mold is provided with a core-receiving aperture 54 which extends from end 40 of the mold inwardly in a straight longitudinal line so as to permit the insertion of a core 56 within axial cavities 42, 44. The fact that mold cavities 52 are inclined relative to the core opening enables the formation of the handle as an integral component of the pacifier and facilitates removal of the molded article from the mold upon completion of the molding step.

The process of molding the pacifier includes filling the mold cavities described above with a molding resin and the subjecting of the resin to suitable conditions of heat and pressure so as to form the article within the mold sections. Depending upon the nature of the molding material, the mold is generally cooled to set the resin in its molded form, and the mold sections are separated to enable removal of the pacifier from the mold.

In the case of injection molding, the resin is generally heated to a molten state in a heating chamber prior to being introduced into the mold cavities under pressure. However, as stated earlier, persons skilled in the molding art will be able, without further instructions, to select from the various molding and casting procedures applicable to production of the pacifier of this invention and to establish the necessary operating parameters depending upon the molding material to be employed.

From the foregoing, it will be seen that applicant has provided a pacifier for infants of unique integrally molded construction having an air passageway, the integrity of which will be maintained even under such conditions where lodging of the pacifier in the throat of the infant may occur. The invention further provides a mold construction and process of molding the pacifier whereby all of the components of the pacifier may be integrally molded and the molded article readily removed from the mold sections.

Various changes, modifications and embodiments have been suggested in the foregoing description, others will be obvious to those skilled in the art. It is intended, therefore, that the present disclosure be taken as illustrative only and not as limiting of the present invention.

What is claimed is:

1. A pacifier for infants comprising a hollow nipple open at one end and closed at its other end, a guard member secured about the perimeter of the nipple adjacent its open end and extending in a plane transverse to the axis of the nipple, said nipple having a base portion adjacent said guard member provided with a region of increased wall thickness at least on the side of said guard member from which said stem extends, said base portion terminating in an annular shoulder on said stem side of the guard member and at least one aperture formed in the wall of said stem between the guard member and the closed end thereof.

2. The pacifier according to claim 1 wherein said hollow nipple has an axially extending base portion from which said guard member extends transversely and a stem portion constituting an extension of said base which terminates in the closed end of the nipple remote from one face of said guard member, said base portion being hollow and extending through said guard member to terminate in an open end beyond the guard member, said base portion being provided with said apertures.

3. The pacifier according to claim 2, including a handle integral with the base portion of the nipple at a location on the side of said guard member remote from the nipple stem.

4. A pacifier according to claim 1, wherein said shoulder is chamfered and the apertures in the nipple are located in said chamfered shoulder.

5. A pacifier according to claim 1, wherein said guard member comprises an annular disc.

6. A pacifier according to claim 1, wherein said handle comprises a ring.

7. A pacifier according to claim 1, molded from a synthetic plastics material.

* * * * *